United States Patent [19]

Leopoldi

[11] Patent Number: 4,697,344
[45] Date of Patent: Oct. 6, 1987

[54] PILL CUTTER

[75] Inventor: Norbert Leopoldi, Chicago, Ill.

[73] Assignee: The Cloverline Incorporated, Chicago, Ill.

[21] Appl. No.: 866,287

[22] Filed: May 23, 1986

[51] Int. Cl.[4] .............................................. B25F 3/00
[52] U.S. Cl. ...................................... 30/124; 225/103
[58] Field of Search .................. 30/124; 225/103, 105, 225/93; 241/168, DIG. 27; 206/528

[56] References Cited

U.S. PATENT DOCUMENTS 2,655,259 10/1953 Davoren ......................... 30/124 UX
4,173,826 11/1979 Leopoldi et al. ...................... 30/124

Primary Examiner—Douglas D. Watts
Attorney, Agent, or Firm—Robert E. Knechtel; Basil E. Demeur

[57] ABSTRACT

A pill cutter including a base member and a top member that is proportioned to receive therein the base member. The base member has therein a resilient pad which has a number of pill receiving pockets which are divided in half by a knife blade which is embedded within the resilient pad. The top member also contains a resilient pad. When the base and top members are pressed together, the pills in the pockets are pressed against the cutting edge of the cutting blades and are cut in half simultaneously. One end of the top member advantageously has its side walls formed in the shape of a scoop which can be used to dispense the pill halves into a container or the like.

2 Claims, 6 Drawing Figures

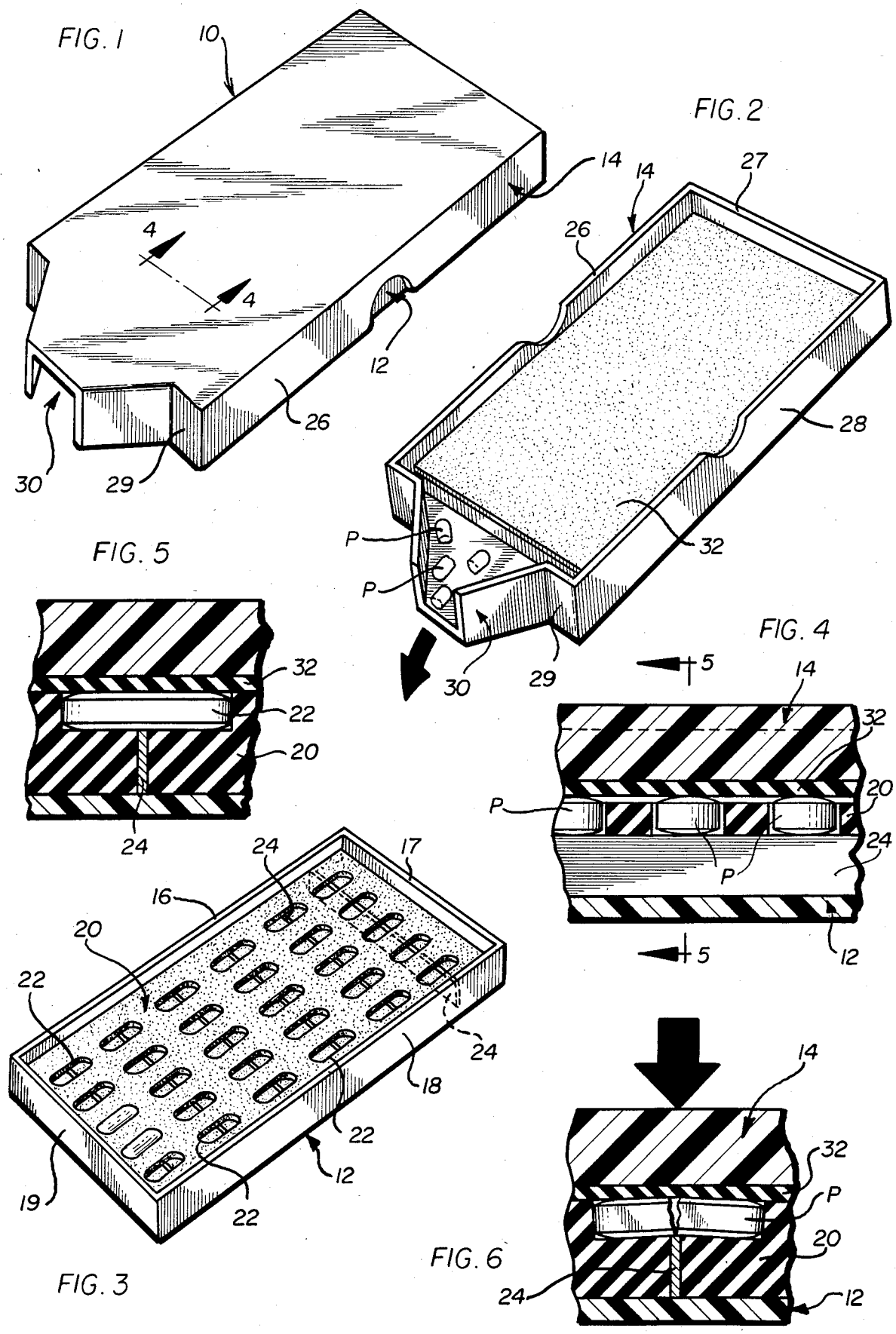

PILL CUTTER

This invention relates generally to an improved pill cutter and more particularly to a pill cutter for simultaneously cutting a plurality of pills. More particularly, it relates to a pill cutter which can function both to cut simultaneously a plurality of pills and to serve as a scoop to contain the cut pills and to dispense them into a pill bottle to other similar type container.

In U.S. Pat. No. 4,173,826 there is disclosed a pill cutter for cutting a pill in half or a quarter. A pill cutter of the type disclosed therein functions very satisfactorily in cutting individual pills one at a time. In many cases, however, it is desired to cut a plurality of pills and to cut them one at a time. To do so with the disclosed pill cutter is very time consuming.

Accordingly, it is an object of the present invention to provide a pill cutter which can cut simultaneously a plurality of pills.

Further still, it is an object to provide such a pill cutter which contains the cut pills so that they cannot spill after they have been cut.

Further still, it is an object to provide such a pill cutter which functions as a scoop to dispense the cut pills into a pill bottle or the like.

The above objectives are accomplished with the pill cutter of the present invention which includes a base member and a top member that is proportioned to receive therein the base member. The base member has side walls and has therein a resilient pad which preferably covers the entire interior surface thereof but is of a depth such that its top surface is below the top of the upper edges of the side walls of the base member. The side walls therefore form a barrier to contain pills within the base member.

The resilient pad has therein a number of pill receiving pockets which are aligned to rows, and each of the pockets which are aligned in a row are divided in half by a knife blade which is embedded within the resilient pad. In other words, for each row of recessed pockets there is a knife blade which divides in half all of the pockets in that row. The cutting edge of knife blade is disposed just below the bottom of the pockets so that the pills can be seated and retained within the pockets.

The top member, as indicated above, is proportioned to receive therein the base member. It also contains a resilient pad which substantially corresponds in size with the resilient pad contained within the base member, and is contained within the top member such that the two resilient pads matingly engage when the base member is received within the top member. Accordingly, when the base and top members are pressed together, the pills in the pockets are pressed against the cutting edge of the cutting blades and are cut in half simultaneously.

One end of the top member advantageously has its side walls formed in the shape of a scoop which can be used to dispense the pill halves into a container or the like. Accordingly, once the pills are cut in half, the top and base members are held pressed together and inverted so that when separated the pill halves in the pockets are spilled into and contained within the top member. The pill halves then can be dispensed into a container simply by tilting the top member to cause the pills to flow toward and through the scoop into the container.

DESCRIPTION OF THE DRAWINGS

FIG. 1 is a top perspective view of the pill cutter with the base member disposed within the top member;

FIG. 2 is a bottom perspective view of the top member;

FIG. 3 is a top perspective view of the base member;

FIG. 4 is a partial sectional view taken along lines 4—4 of FIG. 1;

FIG. 5 is a partial sectional view taken along lines 5—5 of FIG. 4;

FIG. 6 is a partial sectional view like FIG. 5 illustrating the manner in which a pill is cut in half.

DESCRIPTION OF A PREFERRED EMBODIMENT

Referring now to the drawings, there is disclosed a pill cutter 10 including a base member 12 and a top member 14 which is proportioned to receive therein the base member 12. The base member 12, as can be best seen in FIG. 3, is illustrated to be rectangular in shape but it can be of any shape so long as it functions in the manner described below. The base member 12 has four side walls 16–19 and contains therein a resilient pad 20 that preferably covers the entire interior surface thereof. A number of pill receiving pockets 22 are formed in the pad 20, and are aligned in rows. In the illustrated embodiment, there are 6 rows of pockets 22, with each row containing 5 such pockets. The pockets 22 preferably have a depth substantially corresponding to but less than the thickness of the pills, for reasons which will be apparent from the description below.

Each of the pockets 22 which are aligned in a row are effectively divided in half by a knife blade 24 which is embedded within the pad 20. The cutting edges of the knife blades 24 are disposed just below the bottom of the pockets 22 so that the pills can be seated and retained within the pockets, and can be cut in half when the top and bottom members 14, 12 are pressed together, as more fully described below.

The top member 14 is shaped and proportioned to receive therein the bottom member 12 and, in this respect, it has side walls 26–29. The side wall 29 at one end of the top member 14 is formed to provide a scoop 30 for dispensing pills from the top member 14 into a container or the like (not shown). The top member 14 also includes therein a resilient pad 32 which corresponds in shape and size with the resilient pad 20 in the base member 12. The pad 32, however, has no pockets and is of a thickness to bear against the pad 20 when the base member 12 is disposed within the top member 14.

In use, a pill such as the pill P is placed in one or more of the pockets 22 in the base member 12 and then the top member 14 is disposed atop the base member 12 so that the latter is received therein. The base and top members 12, 14 then are pressed together and in so doing the resilient pad 32 forces the pills in the pockets 22 against the cutting edges of the knife blades 24, cutting the pills in half. The base and top members 12, 14 while held together are inverted, and upon then being separated the pill halves will spill into and be contained within the top member 14. The pill halves then can be dispensed into a container simply by tilting the top member 14 to cause the pill halves to slide into and through the scoop 30 into the container, as generally illustrated in FIG. 2.

Thus, it is apparent that there has been provided in accordance with the invention a pill cutter that fully satisfies the objects, aims, and advantages set forth above. While the invention has been described in conjunction with a specific embodiment, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A pill cutter for simultaneously cutting a plurality of pills comprising:

a base member having a bottom wall and side walls, a resilient pad within said base member, a plurality of pill receiving pockets in said pad, said pill receiving pockets being aligned in rows, a knife blade embedded within said pad and disposed with respect to said pill receiving pockets to cut pills disposed within said pockets aligned within a row when pressure is applied to said pill;

a top member having a top wall and side walls proportioned to receive therein said base member, a resilient pad within said top member, said resilient pad in said top member engaging said pills disposed within said pockets when said base member is received within said top member, whereby said pills disposed within said pockets simultaneously are cut by said knife blade when said base and top members are pressed together.

2. The pill cutter of claim 1, wherein said side wall at one end of said top member is formed as a scoop, whereby said cut pills can be dispensed into a container or the like by inverting said base and top members to spill said cut pills into said top member and tilting said top member after removing therefrom said base member so that said cut pills will slide into and through said scoop into the container.

* * * * *